Oct. 14, 1930.  J. F. TRITLE  1,778,697
ADJUSTING SCREW
Original Filed Sept. 7, 1927

Inventor:
John F. Tritle,
by Charles E. Tullar
Attorney.

Patented Oct. 14, 1930

1,778,697

UNITED STATES PATENT OFFICE

JOHN F. TRITLE, OF ERIE, PENNSYLVANIA, ASSIGNOR TO GENERAL ELECTRIC COMPANY, A CORPORATION OF NEW YORK

ADJUSTING SCREW

Original application filed September 7, 1927, Serial No. 218,095. Divided and this application filed July 11, 1928. Serial No. 291,903.

This application is a division of my application Serial No. 218,095, filed September 7, 1927.

The present invention relates to adjusting screws for positioning relatively movable members, and more particularly to adjusting screws adapted for positioning the contact fingers of a drum controller or for use in any other similar service.

The principal object of the present invention is to provide an improved form of adjusting screw for service of the above character adapted readily to permit intentional adjustment of the screw whenever necessary, and at the same time insure that the adjusting screw is secured against accidental misadjustment by jars and vibration.

In accordance with the present invention the adjusting screw is screw threaded into one of the relatively movable members to be adjusted and is provided with a spring washer and a cooperating friction locking disk for preventing accidental misadjustment of the screw while readily permitting intentional adjustment thereof.

Figure 1:
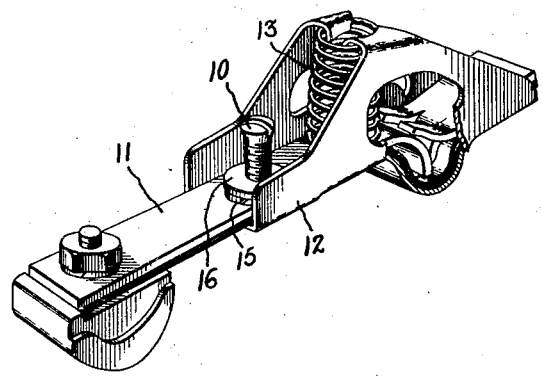
Figure 2:
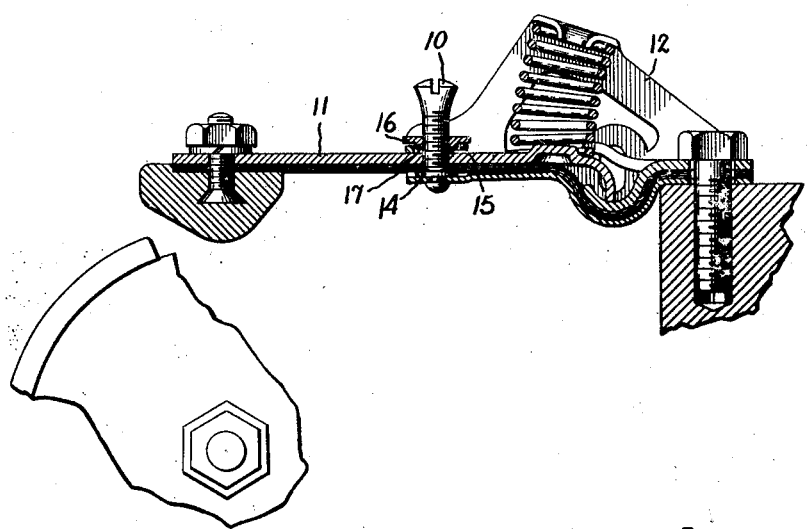

In the accompanying drawing Fig. 1 is a perspective view of a drum controller contact finger provided with an improved adjusting screw in accordance with the present invention and Fig. 2 is a cross sectional view showing more in detail the manner in which the adjusting screw is applied to the contact finger.

As shown in Fig. 1 the adjusting screw 10 is arranged to adjust the contact arm 11 with respect to the channel housing support 12. The contact arm 11 is pivotally mounted at its right hand end for operation between the sides of the channel housing support 12 and the biasing spring 13 serves to maintain the contact finger in the desired position determined by adjustment of the screw 10. The detailed construction and advantageous features of the particular form of contact finger illustrated are fully set forth and claimed in my previously mentioned application and no further detailed description is deemed necessary as the adjusting screw arrangement of the present invention is not necessarily limited to use with such contact fingers but may be applied generally.

As shown more in detail in Fig. 2, the adjusting screw 10 is screw threaded into the movable contact arm 11 with its lower end resting on the reinforcing rivet 14 provided on the lower side of the channel housing support 12 for the contact finger. Adjustment of the screw 10 serves to raise or lower the contact arm 11 into the desired operating relation with the cooperating controller drum indicated diagrammatically in Fig. 2. The adjusting screw 10 is prevented from turning from any position to which it is adjusted by means of the large diameter split spring lock washer 15 which may be of standard form as illustrated and the cooperating friction locking disk 16. The locking disk 16 is screw threaded on the adjusting screw 10 and the projecting circular shoulder or boss 17 formed on the lower side of the disk 16 serves to maintain the lock washer 15 coaxially with the adjusting screw 10 even though the spring lock washer is of much greater diameter than the screw 10.

In assembling the adjusting screw and the locking means therefor, the locking disk 16 is run to the top of the screw threads on the adjusting screw 10 and the screw 10 is then screwed into the threaded opening in the contact arm 11 with the spring lock washer 15 in position to fit over the shoulder 17. Upon tightening the screw 10 the disk 16 rotates with the adjusting screw 10 and thereby compresses the split spring lock washer 15. Thereupon the adjusting screw 10 may be unscrewed to adjust the position of the contact arm 11 as desired without producing rotation of the locking disk 16. This is due to the fact that the frictional engagement of the split spring lock washer 15 with the disk 16 at the increased radius of the shoulder 17 produces a greater friction than that existing between the threads of the disk 16 and the adjusting screw 10. However, this thread friction serves effectively to prevent accidental movement of the adjusting screw 10 from its adjusted position due to vibration or other causes.

What I claim as new and desire to secure by Letters Patent of the United States, is:—

The combination of relatively movable members, an adjusting screw therefor in threaded engagement with one of the members, a locking member screw threaded on said adjusting screw in spaced relation with said one member, and a spring lock washer of materially larger diameter than the adjusting screw interposed between said one member and said locking member for preventing accidental rotation of the adjusting screw while readily permitting adjustment thereof, said locking member having a circular shoulder formed on the side thereof engaging with said spring washer for maintaining the washer coaxial with the screw.

In witness whereof, I have hereunto set my hand this 9th day of July, 1928.

JOHN F. TRITLE.